United States Patent
Chou et al.

(10) Patent No.: US 7,960,742 B2
(45) Date of Patent: Jun. 14, 2011

(54) ACTIVE DEVICE ARRAY SUBSTRATE HAVING ORGANIC MATERIAL LAYER WITH CONCAVE PATTERNS

(75) Inventors: Chen-Nan Chou, Hsinchu (TW); Feng-Lung Chang, Hsinchu (TW); Tin-Wen Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 73 days.

(21) Appl. No.: 12/123,481

(22) Filed: May 20, 2008

(65) Prior Publication Data

US 2008/0217621 A1 Sep. 11, 2008

Related U.S. Application Data

(62) Division of application No. 11/552,988, filed on Oct. 26, 2006, now Pat. No. 7,402,528.

(30) Foreign Application Priority Data

Apr. 25, 2006 (TW) ................................ 95114664 A

(51) Int. Cl.
*H01L 33/00* (2010.01)
*H01L 21/00* (2006.01)

(52) U.S. Cl. .......................................... 257/83; 438/43
(58) Field of Classification Search ............ 257/59, 257/66, 72, 83, E51.018–E51.022; 438/149, 438/725, 29, 43
See application file for complete search history.

(56) References Cited

U.S. PATENT DOCUMENTS

| 7,553,707 B2 * | 6/2009 | Horino et al. ................. 438/149 |
| 2006/0102902 A1* | 5/2006 | Lee et al. ........................ 257/66 |
| 2007/0087534 A1* | 4/2007 | Yasukawa ...................... 438/478 |
| 2007/0090420 A1* | 4/2007 | Chu et al. ...................... 257/291 |
| 2007/0096100 A1* | 5/2007 | Lee et al. ........................ 257/59 |
| 2007/0195235 A1* | 8/2007 | Chang et al. .................. 349/114 |

FOREIGN PATENT DOCUMENTS

| JP | 07-333634 | 12/1995 |
| JP | 2004-247434 | 9/2004 |

OTHER PUBLICATIONS

"Office Action of Japanese counterpart application", issued on Jul. 24, 2009, p. 1-p. 3.

* cited by examiner

*Primary Examiner* — Calvin Lee
(74) *Attorney, Agent, or Firm* — Jiang Chyun IP Office

(57) ABSTRACT

A method of fabricating an active device array substrate is provided. A substrate having scan lines, data lines and active devices formed thereon is provided. Each of the active devices is electrically connected to the corresponding scan line and data line. An organic material layer is formed over the substrate to cover the scan lines, the data lines and the active devices. Then, a plasma treatment is performed to the surface of the organic material layer to form a number of concave patterns. The dimension of each of the concave patterns is smaller than one micrometer. Afterward, pixel electrodes are formed on the organic material layer and each of the pixel electrodes is electrically connected to one of the corresponding active devices.

9 Claims, 6 Drawing Sheets

ACTIVE DEVICE ARRAY SUBSTRATE HAVING ORGANIC MATERIAL LAYER WITH CONCAVE PATTERNS

CROSS-REFERENCE TO RELATED APPLICATION

This application is a divisional application of prior filed application Ser. No. 11/552,988, filed on Oct. 26, 2006, now allowed, which claims the priority benefit of Taiwan application serial no. 95114664, filed on Apr. 25, 2006. The entirety of each of the above-mentioned patent applications is hereby incorporated by reference herein and made a part of this specification.

BACKGROUND OF THE INVENTION

1. Field of the Invention

The present invention relates to an active device array substrate and fabricating method thereof. More particularly, the present invention relates to a thin film transistor array substrate and fabricating method thereof.

2. Description of Related Art

Most displays are designed to provide their users with the greatest viewing comfort. Therefore, a central issue for the manufacturers is to remove as many defects that are detectable by human vision as possible. Using liquid crystal display as an example, a liquid crystal display is manufactured through a series of complicated processes involving at least the fabrication of backlight module, liquid crystal layer and two pieces of substrates. If a small defect appears in one of the processes, quality of the display panel may be adversely affected and visible defects may appear in the final light-on test. One such viewing defect is the so-called 'mura effect', for example.

In addition, an organic material layer is frequently formed over the thin film transistor array substrate of a liquid crystal display to planarize the uneven steps between various devices so that subsequent alignment of the alignment film can be performed smoothly to reduce the probability of alignment defects. The display quality of the panel is closely related to the alignment of the liquid crystal molecules in the alignment engineering. In general, most organic material layer has a smooth and planar surface. Hence, in the presence of even a small defect after the liquid crystal alignment process, overall display quality of the liquid crystal display panel may be significantly affected.

At present, one method of lowering or eliminating mura effect due to defects in the fabrication process includes forming cavity patterns on the surface of an organic material layer with a photolithography process. Since the cavity patterns on the surface of the organic material layer can provide the liquid crystal molecules with different pre-tilt angles in molecular alignment, mura effect is eliminated or lowered. However, the foregoing photolithography process for forming the concave patterns is achieved by exposing the organic material layer through a half-tone photomask and developing the organic material layer thereafter, which is an expensive process. Furthermore, the dimension of the concave patterns produced by the half-tone photolithography process is limited by the resolution of the current stepper machine to the micrometer scale. It is difficult to produce concave patterns on a finer scale. Because the liquid crystal molecules have a dimension in the nanometer scale, the process that can produce nanometer scale concave patterns on the surface of an organic material layer would reduce or lower the mura effect more obviously.

SUMMARY OF THE INVENTION

Accordingly, at least one objective of the present invention is to provide an active device array substrate for eliminating or lowering mura effect.

At least another objective of the present invention is to provide a method of fabricating an active device array substrate with a lower production cost and yet capable of producing concave patterns in the nanometer scale such that mura effect in a liquid crystal display is reduced.

To achieve these and other advantages and in accordance with the purpose of the invention, as embodied and broadly described herein, the invention provides a method of fabricating an active device array substrate. First, a substrate is provided. Then, a plurality of scan lines, a plurality of data lines and a plurality of active devices are formed over the substrate. Each of the active devices is electrically connected to the corresponding scan line and data line. Next, an organic material layer is formed over the substrate to cover the scan lines, the data lines and the active devices. After that, a plasma treatment to the surface of the organic material layer is performed to form a plurality of concave patterns on the surface of the organic material layer. The dimension of each of the concave patterns is smaller than one micrometer. Afterward, a plurality of pixel electrodes is formed on the organic material layer and each of the pixel electrodes is electrically connected to one of the corresponding active devices.

In one embodiment of the present invention, the method of forming the organic material layer includes preparing an organic material solution. Then, the organic material solution is coated onto the substrate. Next, a baking process is performed to cure the organic material solution and form the foregoing organic material layer. The organic material solution includes insulating material, a first solvent and a second solvent. The first solvent has a high boiling point greater than that of the second solvent. Furthermore, the amount of first solvent used in the process is less than that of the second solvent. The first solvent and the second solve are respectively, for example, selected from a group consisting of diethylene glycol methyl ethyl ether (EDM), propylene glycol monomethyl acetate (PGMEA), propylene glycol methyl ether (PGME) and diethylene glycol monoethyl ether acetate (CTAC).

In one embodiment of the present invention, the surface of the organic material solution is maintained at a temperature between 50° C. to 160° C. in the baking process.

In one embodiment of the present invention, before performing the baking process, further includes performing a vacuum drying process.

In one embodiment of the present invention, after forming the organic material layer, further includes forming a plurality of contact openings in the organic material layer. Each contact opening exposes one of the active devices and each one of the pixels is electrically connected to the corresponding active device through the contact opening. According to an embodiment, before forming the organic material layer, further includes forming a protective layer to cover the scan lines, the data lines and the active devices. The contact openings expose the protective layer. In addition, after forming the organic material layer, further includes removing the exposed protective layer to expose the active devices. Preferably, the step of removing the exposed protective layer and the step of performing a plasma treatment to the surface of the organic material layer are carried out concurrently.

In one embodiment of the present invention, the reactive gases in the foregoing plasma treatment includes halogen-containing gas, oxygen, nitrogen, inert gas or other gaseous mixture. In addition, the inert gas is argon, for example.

In one embodiment of the present invention, the foregoing plasma treatment is performed at a pressure not greater than one atmospheric pressure.

In one embodiment of the present invention, the active devices are thin film transistors.

In one embodiment of the present invention, each one of the concave patterns in the foregoing organic material layer has a dimension between about 0.1 to 1 micrometer.

The present invention also provides an active device array substrate comprising a plurality of scan lines, a plurality of data lines, a plurality of active devices, an organic material layer and a plurality of pixel electrodes. The scan lines, the data lines, the active devices are formed over a substrate. Each of the active devices is electrically connected to the corresponding scan line and data line. The organic material layer covers the active devices, the scan lines and the data lines. A surface of the organic material layer has a plurality of concave patterns and each of the concave patterns has a dimension less than 1 micrometer. In addition, the pixel electrodes are disposed on the organic material layer and each of the pixel electrodes is electrically connected to one of the corresponding active devices.

In one embodiment of the present invention, each one of the concave patterns is between 0.1 and 1 micrometer.

In one embodiment of the present invention, the foregoing active device array substrate further includes a protective layer disposed underneath the organic material layer.

The present invention utilizes a special method to form an organic material layer. Then, a plasma treatment is performed to the surface of the organic material layer to form concave patterns so that the liquid crystal molecules are arranged to align at different pre-tilt angles, thereby reducing the mura effect. Furthermore, compared with similar conventional techniques, the method of fabricating concave patterns in the present invent has the advantage of a low production cost and the capacity to produce concave patterns having nanometer scale closing to the dimension of the liquid crystal molecules.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
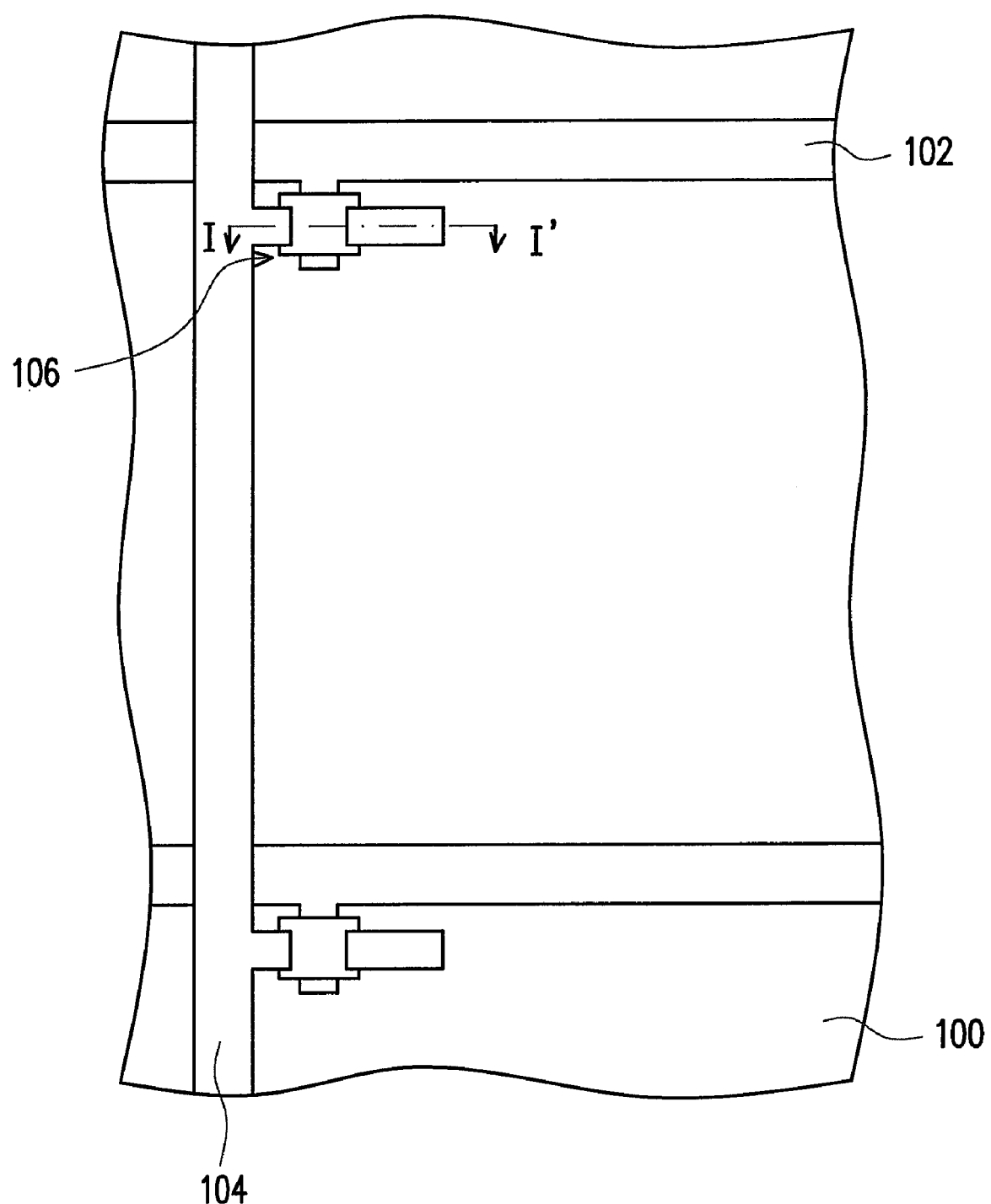
FIGS. 1A and 1B are schematic top views showing the process of fabricating an active device array substrate according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 1B:
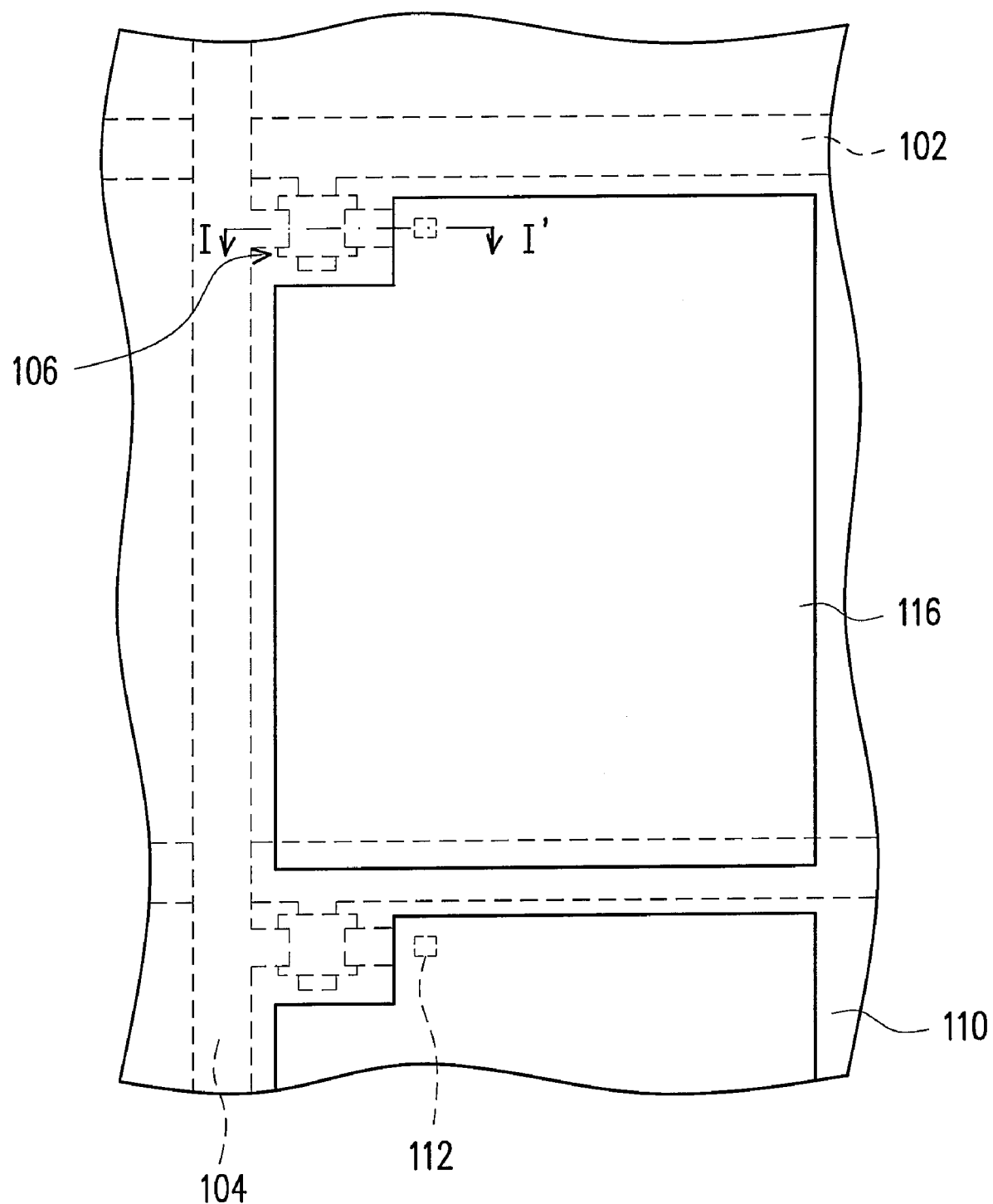

FIGS. 1A and 1B are schematic top views showing the process of fabricating an active device array substrate according to one embodiment of the present invention. FIGS. 2A through 2D are schematic cross-sectional views along section line I-I' of FIGS. 1A and 1B showing the process of fabricating an active device array substrate according to one embodiment of the present invention.

Figure 2A:
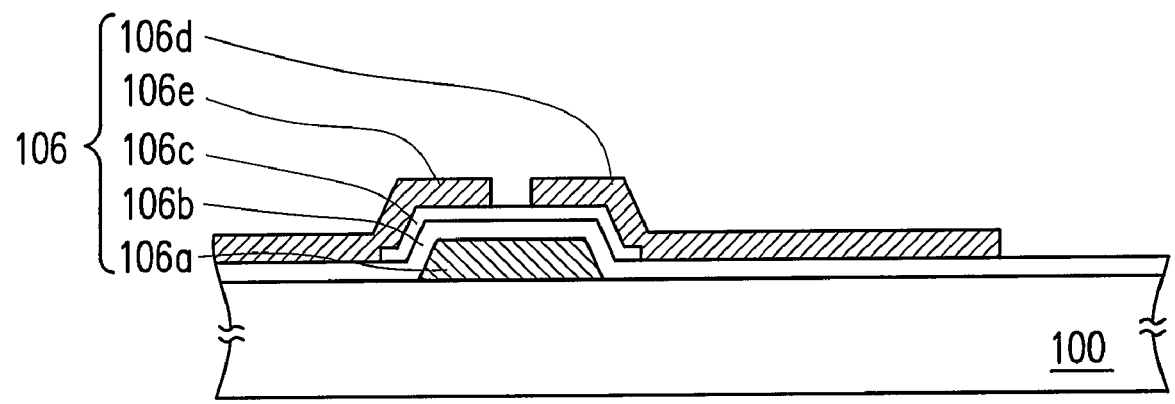
FIGS. 2A through 2D are schematic cross-sectional views along section line I-I' of FIGS. 1A and 1B showing the process of fabricating an active device array substrate according to one embodiment of the present invention.

First, as shown in FIGS. 1A and 2A, the method of fabricating the active device array substrate in the present invention includes providing a substrate 100. Then, a plurality of scan lines 102, a plurality of data lines 104 and a plurality of active devices 106 are formed over the substrate 100. Each of the active devices 106 is electrically connected to the corresponding scan line 102 and data line 104. The active devices 106 are, for example, thin film transistors comprising a gate electrode 106a, a gate insulation layer 106b, a channel layer 106c, a source 106d and a drain 106e. The gate electrode 106a is disposed on the substrate 100. The gate insulation layer 106b covers the gate electrode 106a and the substrate 100. The channel layer 106c is disposed on the gate insulation layer 106b above the gate electrode 106a. The source 106d and the drain 106e are disposed on the two sides of the channel layer 106c above the gate electrode 106a. The active devices 106, the scan lines 102 and the data lines 104 can be fabricated with any conventional method.

Figure 2B:
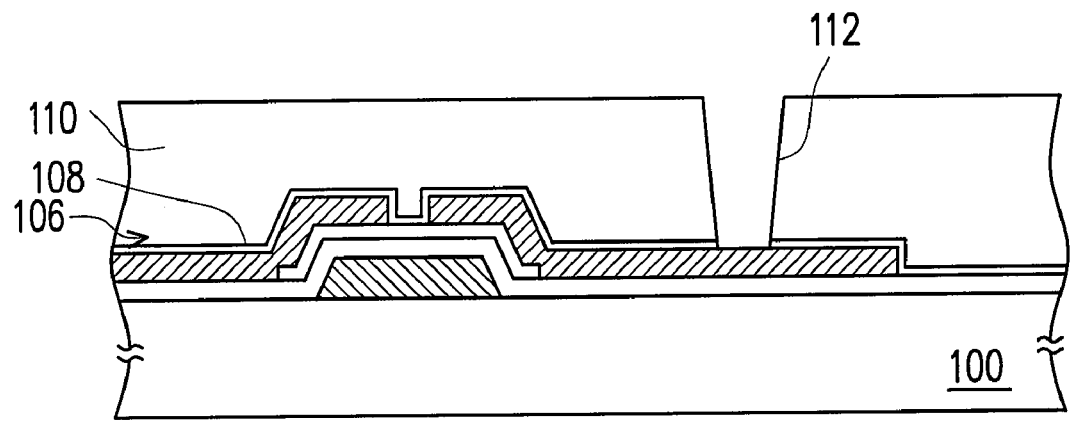

As shown in FIG. 2B, a protective layer 108 is formed over the substrate 100 to cover the scan lines 102, the data lines 104, the active devices 106 and the substrate 100. The protective layer 108 is fabricated using silicon nitride, for example. The method of forming the protective layer 108 includes, for example, performing a plasma-enhanced chemical vapor deposition process. Then, an organic material layer 110 is formed over the substrate to cover the scan lines 102, the data lines 104 and the active devices 106. The method of forming the organic material layer 110 is explained using an example in the following. However, the scope of the present invention is not limited to this method.

First, an organic material solution is prepared. The organic material solution includes, for example, an insulation material, a first solvent and a second solvent. The insulation material is an organic material, for example including propylene acid resin, photosensitive material and a surfactant. The first solvent has a boiling point higher than the second solvent, but a lower amount of the first solvent is used relative to the second solvent. The first solvent and the second solvent are respectively selected from a group consisting of diethylene glycol methyl ethyl ether (EDM), propylene glycol monomethyl acetate (PGMEA), propylene glycol methyl ether (PGME) and diethylene glycol monoethyl ether acetate (CTAC). Using EDM and CATC as examples, EDM has a boiling point of 176° C. and CATC has a boiling point of 217° C. Therefore, CATC is used as the first solvent and EDM is used as the second solvent. Furthermore, the percentage content of CTAC in the organic material solution will not exceed 50%. Afterward, the organic material solution is coated onto the substrate 100.

Figure 2C:
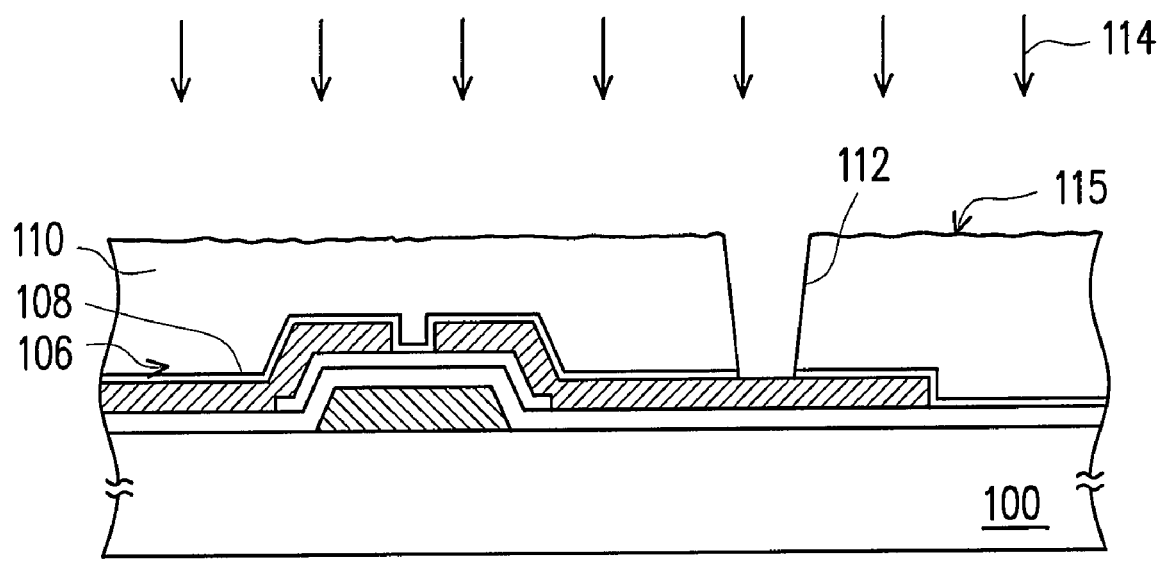

Next, a vacuum-drying process is performed to remove most of the first solvent and the second solvent. It should be noted that the vacuum-drying process can be eliminated and directly proceed to the next process. Then, a first baking process is performed to remove the remaining solvent in the organic material solution to form the organic material layer 110. The baking process is carried out, for example, by maintaining the surface of the organic material solution at a temperature between 50° C. to 160° C. so that a surface layer of the organic material layer 110 is softer than a bottom layer. The organic material layer 110 is formed when the foregoing process is performed. Then, contact openings 112 that expose the protective layer 108 is formed by performing photolithography processes such as an exposure and development process. After that, a second baking process is performed to cure the organic material layer after forming the contact openings 112. Subsequently, as shown in FIG. 2C, a plasma treatment 114 to the surface of the organic material layer 110 is performed to form concave patterns 115 on the surface of the organic material layer 110 globally. Each of the concave patterns has a dimension less than 1 micrometer. In one preferred embodiment, each of the concave patterns 115 has a dimension between 1 and 0.1 micrometer. When the finished active device array substrate is subsequently assembled to another substrate to form a liquid crystal display panel, these concave patterns 115 provide irregular dispersion and refraction to passing light, and the liquid crystal molecules is able to align at different pre-tilt angles. Thus, when mura effect due to defects in the active device array substrate or unevenness due to alignment engineering occurs on a liquid crystal display panel, such conditions are rendered less obvious by the non-isotropic design of these concave patterns 115. Consequently, mura effect on the liquid crystal display is eliminated or reduced. It should be noted that the plasma treatment 114 might simultaneously remove the protective layer 108 at the bottom of the contact openings 112 and expose the source 106d of the active devices 106. In another embodiment, the organic material layer 110 may also be used as a mask for performing an additional etching process for removing the protective layer 108 at the bottom of the contact openings 112. In other words, the process of removing the protective layer 108 at the bottom of the contact openings 112 and the plasma treatment can be carried out concurrently or separately. If the process of removing the protective layer 108 and the plasma treatment are carried out separately, there is no particular restriction on their order of performance.

The reactive gases used in the plasma treatment 114 includes, for example, halogen-containing gas, oxygen, nitrogen, inert gas or a gaseous mixture thereof. The inert gas is argon, for example. In addition, the plasma treatment is carried out at a pressure of one atmospheric pressure or below, for example.

Figure 2D:
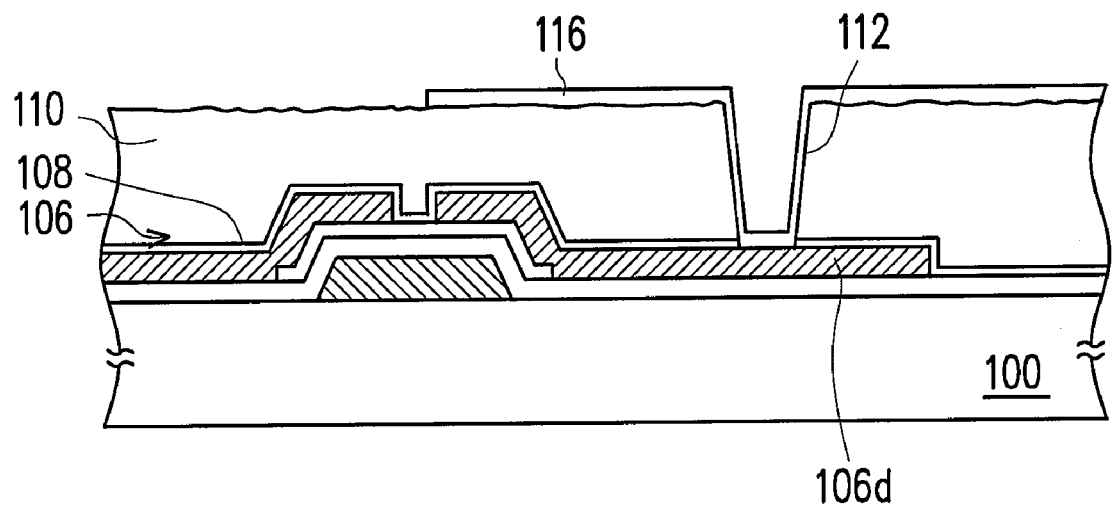

As shown in FIG. 2D, pixel electrodes 116 are formed on the organic material layer 110. Each of the pixel electrodes 116 is electrically connected to the source 106d of the corresponding active device 106. The material constituting the pixel electrodes 116 includes, for example, indium-tin oxide. After the foregoing process, an active device array substrate of the present invention is formed. A top view of the active device array substrate is shown in FIG. 1B.

Second Embodiment

In the first embodiment, the active device array substrate is formed with a protective layer under the organic material layer. However, the protective layer is not absolutely essential in the present invention. In fact, the organic material layer can be directly formed after forming the active devices, the data lines and the scan lines. In the following, a detailed description is provided.

Figure 3A:
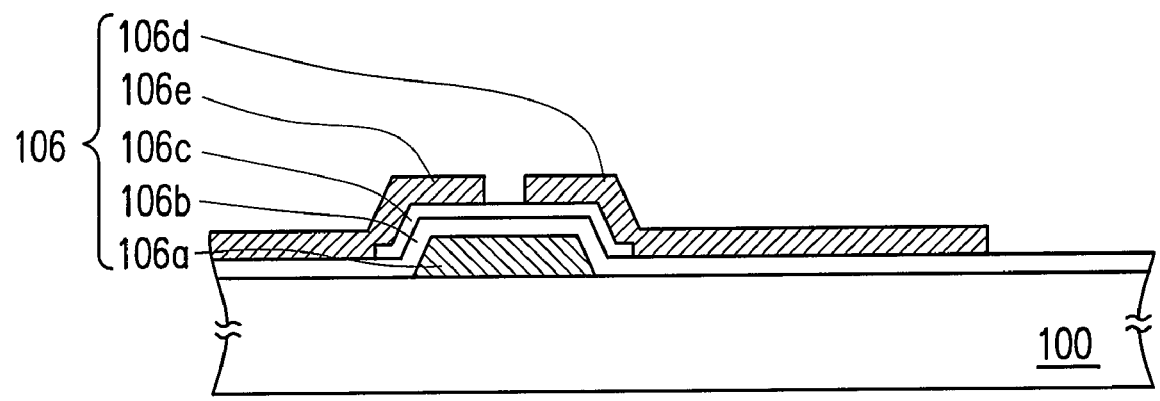
FIGS. 3A through 3D are schematic cross-sectional views showing the process of fabricating an active device array substrate according to a second embodiment of the present invention.

FIGS. 3A through 3D are schematic cross-sectional views showing the process of fabricating an active device array substrate according to a second embodiment of the present invention. As shown in FIG. 3A, the method of fabricating the active device array substrate in the present invention includes providing a substrate 100. Then, a plurality of scan lines 102, a plurality of data lines 104 and a plurality of active devices 106 are formed over the substrate 100. Each of the active devices 106 is electrically connected to the corresponding scan line 102 and data line 104.

Figure 3B:
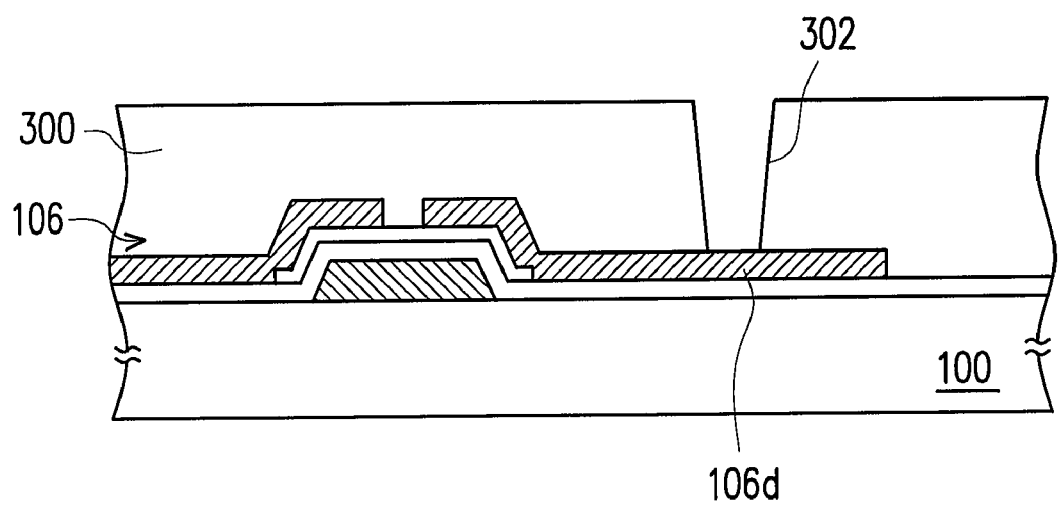

As shown in FIG. 3B, an organic material layer 300 is formed over the substrate 100 to cover the scan lines 102, the data lines 104 and the active device 106. Since the material constituting the organic material layer 300 and the method of forming the organic material layer 300 are identical to ones in the first embodiment, a detailed description is omitted. After that, contact openings 302 that expose the source 106d of the active devices 106 are formed in the organic material layer 300.

Figure 3C:
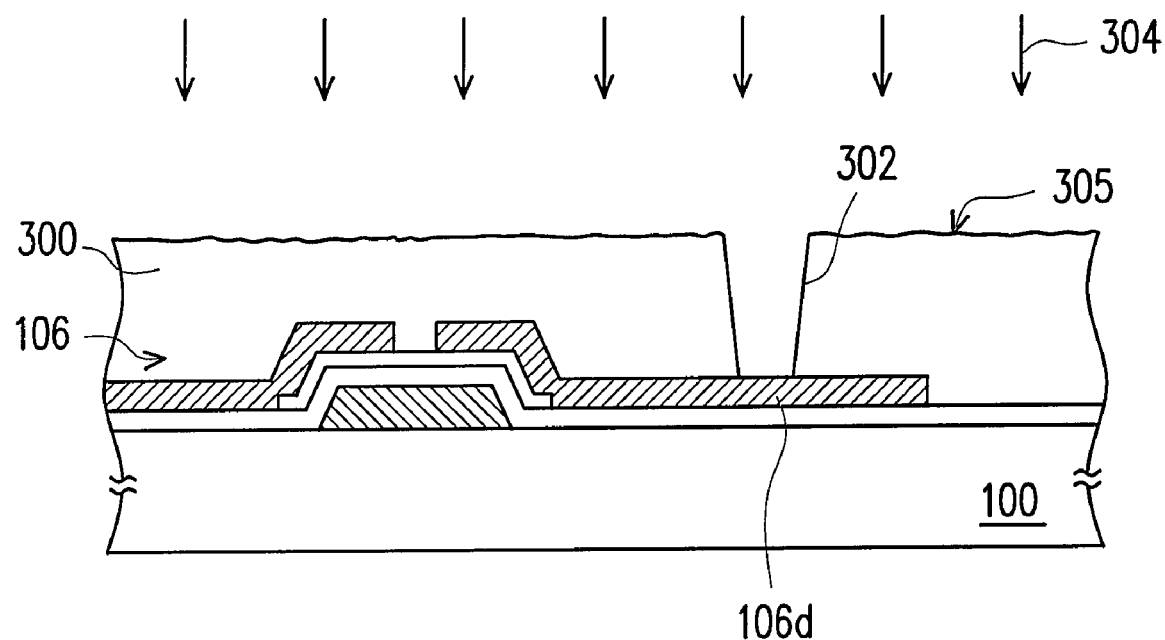

As shown in FIG. 3C, a plasma treatment 304 to the surface of the organic material layer 300 is performed to form concave patterns 305 on the surface of the organic material layer 300. Since the conditions for performing the plasma treatment 304 are identical to that of the plasma treatment 114 in the first embodiment, a detailed description is not repeated here. Each of the concave patterns 305 has a dimension less than 1 micrometer. In one preferred embodiment, the dimension of each of the concave patterns 305 is between 1 and 0.1 micrometer. The concave patterns 305 provide irregular dispersion and refraction to passing light, and the liquid crystal molecules is able to align at different pre-tilt angles. Thus, the problem of having mura effect on an assembled liquid crystal display due to defects in the active device array substrate is eliminated or minimized.

Figure 3D:
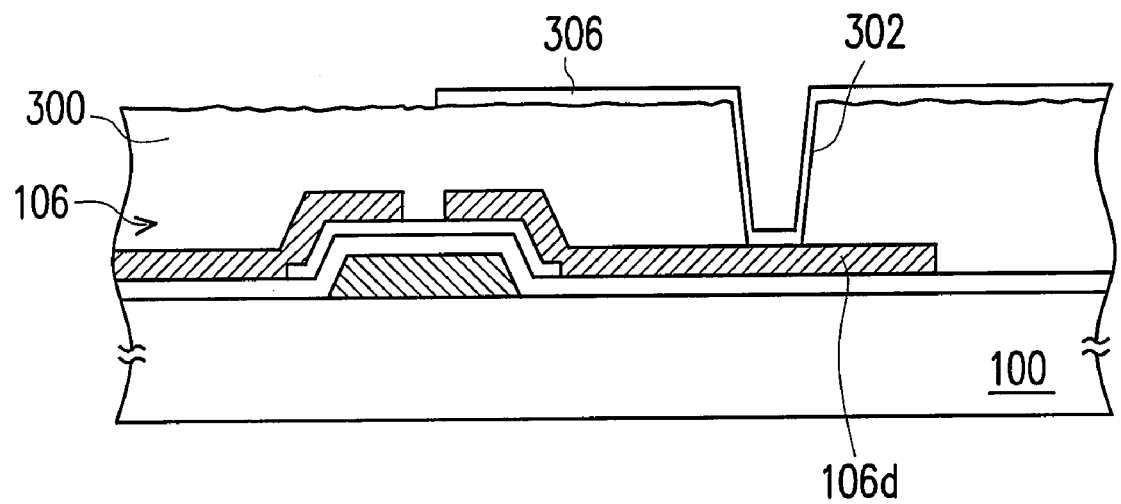

As shown in FIG. 3D, pixel electrodes 306 are formed on the organic material layer 300. Each of the pixel electrodes 306 is electrically connected to the corresponding active device 106 through the contact opening 302.

The present invention utilizes a special method to form the aforementioned organic material layer. Then, a plasma treatment is performed to the surface of the organic material layer to form concave patterns. The concave patterns render the liquid crystal molecules to align at different pre-tilt angles, thereby eliminating or minimizing the mura effect. Furthermore, if the plasma treatment and the process of etching the protective layer are performed in the same processing step, the production process is also simplified.

In the following, the structure of an active device array substrate formed by the foregoing method is described. FIG. 1B is a top view of the active device array substrate according to one embodiment of the present invention. FIG. 2D is a schematic cross-sectional view along line I-I' of FIG. 1B. As shown in FIGS. 1B and 2D, the active device array substrate in the present invention includes a substrate 100, a protective layer 108, an organic material layer 110 and a plurality of pixel electrodes 116. The substrate 100 has a plurality of scan lines 102, a plurality of data lines 104 and a plurality of active devices 106 disposed thereon. Each of the active devices 106 is electrically connected to the corresponding scan line 102 and data line 104. The protective layer 108 covers the active devices 106, the scan lines 102 and the data lines 104 and the organic material layer 110 covers the protective layer 108.

The surface of the organic material layer 110 has a plurality of concave patterns 115. Furthermore, each of the concave patterns 115 has a dimension less than 1 micrometer. In one preferred embodiment, each of the concave patterns 115 has a dimension between 0.1 and 1 micrometer. The concave patterns 115 provide irregular dispersion and refraction to passing light, and mura effect on an assembled liquid crystal display due to defects in the active device array substrate is eliminated or minimized. Furthermore, the organic material layer 110 is fabricated using an organic material including, for example, propylene acid resin, photosensitive material and a surfactant or other materials.

The pixel electrodes 116 are disposed on the organic material layer 110, and each of the pixel electrodes 116 is electrically connected to one of the corresponding active devices 106.

In another embodiment, the protection layer in the active device array substrate can be eliminated so that the organic material layer directly covers the active devices, the scan lines and the data lines. As shown in FIG. 3D, no protective layer is formed under the organic material layer 300 so that the organic material layer 300 directly covers the active devices 106, the scan lines 102 and the data lines 102. In particular, the surface of the organic material layer 300 has a plurality of concave patterns 305 and each of the concave patterns 305 has a dimension less than 1 micrometer. In one preferred embodiment, each of the concave patterns 305 has a dimension between 0.1 and 1 micrometer.

The active device array substrate of the present invention has concave patterns, each one having a dimension less than 1 micrometer, formed on the surface of the organic material layer. Hence, the liquid crystal molecules can be aligned at different pre-tilt angles, thereby eliminating or minimizing mura effect on a liquid crystal panel due to defects in the active device array substrate.

It will be apparent to those skilled in the art that various modifications and variations can be made to the structure of the present invention without departing from the scope or spirit of the invention. In view of the foregoing, it is intended that the present invention cover modifications and variations thereof provided they fall within the scope of the following claims.

What is claimed is:

1. An active device array substrate, comprising:
   a plurality of scan lines, a plurality of data lines and a plurality of active devices formed over a substrate, wherein each of the active devices is electrically connected to the corresponding scan line and data line;
   an organic material layer covering the active devices, the scan lines, and the data lines, wherein the organic material layer has a plurality of concave patterns on a surface thereof, and each of the concave patterns has a dimension less than 1 micrometer; and
   a plurality of pixel electrodes disposed on the organic material layer and covering a portion of the concave patterns of the organic material layer, wherein each of the pixel electrodes is electrically connected to one of the corresponding active devices, and each of the pixel electrodes has a bottom surface and the whole bottom surface directly contacts with the concave patterns of the organic material layer.

2. The active device array substrate of claim 1, wherein each of the concave patterns has a dimension between about 0.1 and 1 micrometer.

3. The active device array substrate of claim 1, further comprising a protective layer disposed under the organic material layer.

4. The active device array substrate of claim 1, wherein the plurality of concave patterns are continuously disposed on the surface of the organic material layer.

5. The active device array substrate of claim 1, wherein the organic material layer has a top surface, and the concave patterns are on the whole top surface of the organic material layer.

6. An active device array substrate, comprising:
   a plurality of scan lines, a plurality of data lines and a plurality of active devices formed over a substrate, wherein each of the active devices is electrically connected to the corresponding scan line and data line;
   an organic material layer covering the active devices, the scan lines, and the data lines, wherein the organic material layer has a rough surface with a plurality of concave patterns, and each of the concave patterns has a dimension less than 1 micrometer; and
   a plurality of pixel electrodes disposed on the organic material layer and covering a portion of the concave patterns of the organic material layer, wherein each of the pixel electrodes is electrically connected to one of the corresponding active devices. and the pixel electrodes have a bottom surface. and the whole bottom surface of the pixel electrodes directly contacts with the concave patterns of the organic material layer.

7. The active device array substrate of claim 6, wherein each of the concave patterns has a dimension between about 0.1 and 1 micrometer.

8. The active device array substrate of claim 6, further comprising a protective layer disposed under the organic material layer.

9. The active device array substrate of claim 6, wherein the organic material layer has a top surface serving as the rough surface, and the concave patterns are on the whole top surface of the organic material layer.

* * * * *